United States Patent [19]

Anzai et al.

[11] Patent Number: 4,927,893
[45] Date of Patent: May 22, 1990

[54] PROCESS FOR PRODUCING METHACRYLIMIDE GROUP-CONTAINING POLYMER

[75] Inventors: Hisao Anzai; Hideaki Makino, both of Ohtake; Masami Ootani, Kuga; Isao Sasaki, Ohno; Kozi Nishida, Toyama, all of Japan

[73] Assignee: Mitsubishi Rayon Co., Ltd., Tokyo, Japan

[21] Appl. No.: 406,436

[22] Filed: Sep. 12, 1989

[30] Foreign Application Priority Data

Oct. 31, 1988 [JP] Japan ................. 63-275292

[51] Int. Cl.$^5$ ................. C08F 8/32
[52] U.S. Cl. ................. 525/378; 525/324.9; 525/330.5; 525/379
[58] Field of Search ................. 525/378, 379

[56] References Cited

U.S. PATENT DOCUMENTS

| | | | |
|---|---|---|---|
| 2,146,209 | 2/1939 | Graves | 260/2 |
| 3,234,303 | 2/1966 | Bild et al. | 525/52 |
| 3,252,950 | 5/1966 | Terenzi et al. | 526/224 |
| 3,284,425 | 11/1966 | Schröder et al. | 525/378 |
| 4,246,374 | 1/1981 | Kopchik | 525/80 |
| 4,745,159 | 5/1988 | Anzai et al. | 525/329 |
| 4,816,524 | 3/1989 | Anzai et al. | 525/378 |

*Primary Examiner*—Bernard Lipman
*Attorney, Agent, or Firm*—Brumbaugh, Graves, Donohue & Raymond

[57] ABSTRACT

A process for producing continuously a methacrylimide group-containing polymer by adding a compound represented by the following formula:

$$R-NH_2$$

wherein R represents H, an alkyl group having 1 to 12 carbon atoms, a cycloalkyl group having 7 to 11 carbon atoms, or an aryl group having 6 to 10 carbon atoms, to a methacrylic polymer in the presence of a solvent, and carrying out the imidization reaction is disclosed.

Key point of the process is that raw materials for said reaction are fed from one end part of a reactor, and liquid mixture that finished the reaction is removed from other part of the reactor positioned not lower than the one end part.

3 Claims, 1 Drawing Sheet

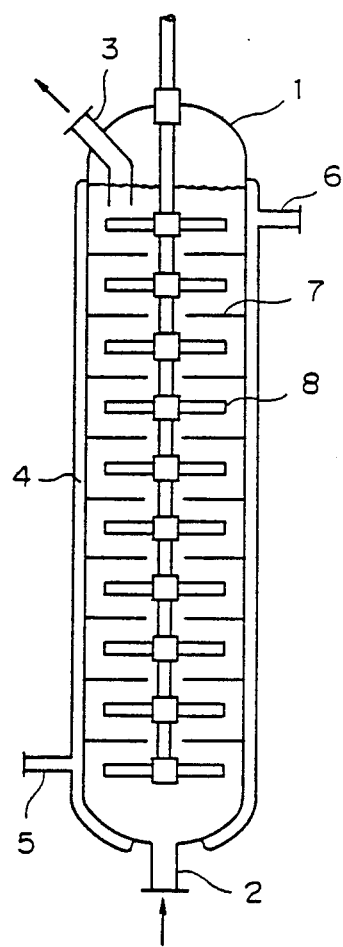

PROCESS FOR PRODUCING METHACRYLIMIDE GROUP-CONTAINING POLYMER

BACKGROUND OF THE INVENTION

1. Field of the Invention

The present invention relates to a process for producing continuously a methacrylimide group-containing polymer excellent in transparency and mechanical properties.

2. Description of the Prior Art

Since methacrylic resins are excellent not only in transparency but also in weather resistance and mechanical properties they have become to be used in various end uses as in high-performance optical materials, decorative materials, automobiles, and electric appliances. Recently, the methacrylic resins are often used under high temperature conditions, and therefore not only excellent transparency but also high heat resistance is increasingly sought for the methacrylic resins in the market. In other words, transparent resins that can keep excellent optical characteristics for a long period of time under high temperature conditions is in need.

As heat resistant transparent resins, imide group-containing polymers are known. To produce such polymers, there have been proposed, for example, (1) a process disclosed in U.S. Pat. No. 2,146,209 wherein a polymer of acrylic acid, methacrylic acid or their ester, and a primary amine, ammonia or a compound capable of liberating a primary amine are heated to react in the presence of a solvent, (2) a process disclosed in U.S. Pat. No. 3,284,425 wherein a methyl methacrylate polymer is reacted with a primary amine in the presence of water, and (3) a process disclosed in U.S. Pat. No. 4,246,374 wherein an acrylic polymer, and ammonia or a primary amine are reacted in an extruder.

However, since the boiling point of the solvent used in the process (1) mentioned above is high, the process (1) has defects that complete removal of the solvent from an imidized polymer produced is hard on a commercial scale, and the resulting imidized polymer is colored so that the transparency of the polymer is low. In the process (2) mentioned above, since a primary amine is reacted in the presence of water, hydrolysis of methyl methacrylate segments occurs, so that it is difficult to obtain an imidized polymer having a high heat resistance, and it is difficult to effect a uniform imidization reaction. Further, since the process (3) mentioned above includes an imidization reaction wherein a highly viscous polymer and a gaseous imidizing agent are reacted, it is difficult to effect a uniform imidization reaction, so that it is hard to obtain a uniformly imidized polymer.

Therefore, although the imidized polymers produced by the process explained above are improved in heat resistance, such disadvantages are involved in the processes that the transparency of the resulting imidized polymers is poor, the molecular weight of the polymer is substantially lowered, and the imidization reaction is not uniform, when the imidized polymers are to be produced in commercial scale.

SUMMARY OF THE INVENTION

The object of the present invention is to provide a process for producing a methacrylimide group-containing polymer that retains excellent optical properties and superior mechanical properties which are intrinsic to methacrylic polymers, and has excellent heat resistance.

The object of the present invention is achieved by providing a process for producing continuously a methacrylimide group-containing polymer by adding a compound represented by the following formula:

wherein R represents H, an alkyl group having 1 to 12 carbon atoms, a cycloalkyl group having 7 to 11 carbon atoms, or an aryl group having 6 to 10 carbon atoms, to a methacrylic polymer in the presence of a solvent, and carrying out imidization reaction, wherein raw materials for said reaction are fed from one end part of a reactor and the liquid mixture that finished the reaction is removed from other part of the reactor positioned not lower than the one end part.

BRIEF DESCRIPTION OF THE DRAWING

The accompanying drawing is a diagrammatic view of an apparatus to be used for the imidization reaction to produce the methacrylimide groupcontaining polymer.

DETAILED EXPLANATION OF THE INVENTION

In the present specification, the term "methacrylimide group-containing polymer" means a polymer which is prepared by introducing imide units represented by the following formula:

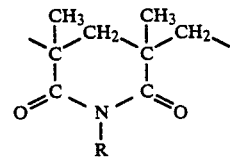

wherein R represents H, an alkyl group having 1 to 12 carbon atoms, a cycloalkyl group having 7 to 11 carbon atoms, or an aryl group having 6 to 10 carbon atoms, into side chains of a methacrylic polymer.

A methacrylic polymer that is a precursor of the methacrylimide group-containing polymer can be prepared by polymerizing methacrylic acid, an ester of methacrylic acid or a mixture of them, or a monomer mixture containing methacrylic acid, an ester of methacrylic acid in an amount of at least 50% by weight and a monoethylenic monomer copolymerizable therewith such as an acrylate, styrene and α-methyl styrene.

As preferable methacrylate can be mentioned, for example, methyl methacrylate, ethyl methacrylate, propyl methacrylate, butyl methacrylate, cyclohexyl methacrylate, 2-ethylhexyl methacrylate and benzyl methacrylate. Of these, methyl methacrylate is most preferably used. As the copolymerizable acrylate can be mentioned methyl acrylate, ethyl acrylate, butyl acrylate, cyclohexyl acrylate, 2-ethylhexyl acrylate and benzyl acrylate, with methyl acrylate being preferable.

In the polymerization of the methacrylic acid, methacrylate or monomer mixture containing them, a radical polymerization initiator is generally used. The radical polymerization initiator which decompose at a reaction temperature to generate radicals are preferably used, and as exmples thereof can be mentioned organic acid peroxides such as di-tert-butyl peroxide, dicumyl peroxide, methyl ethyl ketone peroxide, di-tert-butyl perphthalate, di-tert-butyl perbenzoate, tert-butyl peracetate, 2,5-dimethyl-2,5-di(tert-butyl-peroxy)hexane, di-tert-amyl peroxide, benzoin peroxide and lauryl peroxide, and azo compounds such as azobisisobutanol diacetate, 1,1'-azobiscyclohexanecarbonitrile, 2-phenylazo-2,4-dimethyl-4-methoxyvaleronitrile, 2-cyano-2-propylazoformamide, and 2,2'-azobisisobutyronitrile.

These radical polymerization initiators may be used alone or as a mixture of two or more of them. The amount of the radical polymerization initiator to be used is selected in due consideration of polymerization temperature and desired molecular weight of the polymer.

The molecular weight of the methacrylic polymer is determined by the amount of the radical polymeriation initiator and the polymerization temperature. The polymerization temperature is generally 60° to 170° C.

The solvent used in the imidization reaction must be one that would not hamper the progress of the reaction and substantially would not react with liquid mixture for the reaction. Specific examples thereof include alcohols such as methanol, ethanol and propanol, aromatic hydrocarbons such as benzene, toluene and xylene, and ethers and ketones such as methyl ethyl ketone, glyme, dioxane and tetrahydrofuran. These solvents may be used alone or as a mixture of two or more of them.

In the present invention, a compound represented by the formula R—$NH_2$ (hereinafter may referred to as an imidizing agent) is added to the methacrylic polymer in the presence of the solvent to effect the imidization reaction, in which formula R represents H, an alkyl group having 1 to 12 carbon atoms, a cycloalkyl group having 7 to 11 carbon atoms or an aryl group having 6 to 10 carbon atoms.

These alkyl group, cycloalkyl group and aryl group may be unsubstituted or substituted, for example, with halogen, alkoxy group, acyl group or carboxyl group. Exemplary of the imidizing agents are amines such as methylamine, ethylamine, n-propylamine, n-butylamine, heptylamne, hexylamine, octylamine, nonylamine, decylamine, dodecylamine, hexadecylamine, octadecylamine, isobutylamine, secbutylamine, tert-butylamine, isopropylamine, 2-ethylhexylamine, phenetylamine, benzylamine, p-chlorobenzylamine and dimethoxyphenetylamine, alanine, glycine, 3'-aminoacetophenone, 2-aminoanthraquinone, and p-aminobenzoic acid as well as cyclohexylamine, 2-amino-4,6-dimethylpyridine, 3-aminophthalimide, 2-aminopyridine, 2-aminothiazole, 5-amino-1-H-tetrazole, aniline, bromoaniline, dibromoaniline, tribromoaniline, chloroaniline, dichloroaniline, trichloroaniline and p-toluidine. Of these, ammonia, methylamine, ehtylamine, cyclohexylamine and aniline are preferable. The amount of these imidizing agents to be used is generally more than 20 mol % for the monomer unit of the methacrylic polymer.

In the practices of the present invention, generally the methacrylic polymer is dissolved in the solvent, and is fed together with, or separately from the imidizing agent from one end part of a reactor, and then the imidization reaction is carried out. The imidization reaction is carried out at a temperature in the range of 150° to 300° C., and preferably 170° to 280° C. Although reaction time is generally more than 10 min but up to 10 hours in accordance with the reaction temperature and imidization degree desired.

The most important point of the present invention resides in that the liquid mixture obtained after finish of the imidization reaction is removed from a part of the reactor positioned not lower than the one part of the reactor from which the raw materials for the reaction are fed. For instance, the liquid mixture after the imidization reaction is removed from the other end part of the reactor. If the liquid mixture after the reaction is removed from a part of the reactor positioned lower than the one end part from which the raw materials are fed, it will only result in that the produced methacrylimide group-containing polymer becomes pale yellow, and the mechanical strength of the polymer is poor.

As the reactor to be used in carrying out the present invention, for example, a reactor that has a relatively elongated shape and has a structure with baffle plates such as static mixers therein can be used, or a reactor that has a plurality of reaction zones each having a stirring means may be used, with a reactor of the latter type being particularly preferable.

The accompanying drawing shows an example of reactors for the imidization. A body 1 of the reactor has an inlet 2 for raw materials for the imidization reaction and an outlet 3 for liquid mixture after finish of the imidization reaction, and a heating jacket 4 is provided outside of the body 1 of the reactor. A heating medium is circulated through an inlet 5 and an outlet 6 of the jacket 4. The interior of the reactor body 1 is divided into 10 sections by partition plates 7, and stirring vanes 8 are provided in each section.

After the finish of the imidization reaction, volatiles are separated from methacrylimide polymer prepared. As a method for separating the volatiles including the solvent as well as unreacted imidizing agent and biproducts, a method wherein the liquid mixture is generally heated under reduced pressure at 200° to 300° C. is used, and an apparatus such as a screw extruder or a devolatizer is used. The volatiles remaining in the polymer is finally reduced down to 1% by weight or less, and preferably down to 0.5% by weight.

According to the present invention, methacrylimide group-containing polymers excellent in transparency and mechanical properties and having high heat resistance can effectively be produced on a commerical scale. Thus, the polymers of the present invention can widely be used for filters for CRT's, filters for television sets, fluorescent lamp filters, liquid crystals of illuminators, and optical fiber core materials.

EXAMPLES

Now, the present invention will be described in further detail with reference to Examples. However, it should be understood that the present invention is by no means restricted by such specific Examples. All the parts and the percentages quoted in the Examples represent respectively parts and percentages by weight.

The measurement of the physical properties of the polymers obtained in the Examples was carried out as follows:

(1) Intrinsic viscosity:

In order to determine the intrinsic viscosity of the polymer, flow time ($t_s$) of a solution containing 0.5% by weight of a sample polymer in dimethylformamide, and the flow time ($t_0$) of dimethylformamide were measured by a Deereax Bishoff viscometer at 25°±0.1° C., then the relative viscosity $\eta_{rel}$ of the polymer was determined from the $t_s/t_0$ value, and the intrinsic viscosity of the polymer was calculated from the following formula:

$$\text{Intrinsic viscosity} = (\lim \eta_{rel}/C)_{c \to 0}$$

wherein C represents the number of grams of the sample polymer per 100 ml of the solvent.

(2) Heat distortion temperature:

The heat distortion temperature was measured according to ASTM D 648.

(3) Bending strength:

The bending strength was measured according to ASTM D790.

Example 1

100 parts of a polymethyl methacrylate (having an intrinsic viscosity of 0.28) were dissolved in a solvent mixture of 100 parts of toluene and 30 parts of methanol, and the solution was continuously fed into an imidization reactor at a rate of 4.6 l/h from the lowest part of the imidization reactor, the imidization reactor was a vertical type, and having an internal volume of 28 liter, an internal diameter of 200 mm and height of about 900 mm. Partitions were provided in the reactor to divide the reactor into ten reaction zones arranged longitudinally, and the reaction zones were provided respectively with stirring blades attached on a common axis thereby stirring the reaction zones sufficiently. On the other hand, monomethylamine dissolved in methanol to have a concentration of 34% was fed to the reactor from the same feding part as that for the polymethyl methacrylate solution at a rate of 1.8 l/h, and the imidization reactor was kept at 240° C. The liquid mixture which finished the reaction was removed from the top reaction zone of the imidization reactor by a pump, was led to a vent extruder having a screw diameter of 30 mm in which the pressure was reduced to separate volatiles from polymer. At the same time, the imidized polymer prepared was extruded from a die to form a strand and the strand was then cut to produce pellets. Physical properties of the methacrylimide group-containing polymer prepared in the shape of pellets are shown as follows:

Intrinsic viscosity: 0.35
Nitrogen content: 6.5%
Heat distortion temperature: 153° C.
Bending strength: 1450 Kg/cm²

Comparative Example

Example 1 was repeated, except that the feeding part for the raw materials for the reaction and the part from which the liquid mixture after the reaction was removed were exchanged, so that the raw materials for the imidization reaction were fed from the top of the reaction zone of imidization reactor while the liquid mixture after the finish of the reaction was removed from the lowest reaction zone of the reactor. The physical properties of the polymer were measured, and the mechanical strength thereof was poor as follows:

Intrinsic viscosity: 0.32
Nitrogen content: 6.4%
Heat distortion temperature: 151° C.
Bending strength: 980 Kg/cm²

The obtained methacrylimide group-containing polymer in the shape of pellets was colored pale yellow, which meant that it was poor with respect to the transparency of the polymer, in comparison with the methacrylimide group-containing polymer prepared in Example 1.

Example 2

Example 1 was repeated, except that the imidization reactor was slanted making an angle of 45° with horizontal plane and concentration of the monomethylamine dissolved in methanol was 30%. The physical properties of the polymer are shown as follows:

Intrinsic viscosity: 0.36
Nitrogen content: 6.2%
Heat distortion temperature: 148° C.
Bending strength: 1410 Kg/cm²

What we claim:

1. In a process for producing continuously a methacrylimide group-containing polymer by adding a compound represented by the following formula:

$$R-NH_2$$

wherein R represents H, an alkyl group having 1 to 12 carbon atoms, a cycloalkyl group having 7 to 11 carbon atoms, or an aryl group having 6 to 10 carbon atoms, to a methacrylic polymer in the presence of a solvent, and carrying out the imidization reaction, the improvement which comprises feeding raw materials for said reaction from one end part of a reactor and removing liquid mixture that finished the reaction from other part of the reactor positioned above the one end part.

2. The process as claimed in claim 1, wherein the raw materials are fed from a bottom of the reactor and the liquid mixture is removed from a top of the reactor.

3. The process as claimed in claim 1, wherein the reactor is slanted making an angle of about 45° with the horizontal plane.

* * * * *